(12) United States Patent
Yamamoto et al.

(10) Patent No.: US 6,400,064 B1
(45) Date of Patent: Jun. 4, 2002

(54) ULTRASONIC MOTOR AND METHOD OF FABRICATING

(75) Inventors: Takashi Yamamoto, Chiryu; Toshiatsu Nagaya, Kuwana, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/680,449

(22) Filed: Oct. 6, 2000

(30) Foreign Application Priority Data

Oct. 8, 1999 (JP) ............................................ 11-287957
Aug. 10, 2000 (JP) ...................................... 2000-243149

(51) Int. Cl.$^7$ ............................................ H01L 41/187
(52) U.S. Cl. .................... 310/323.03; 310/358
(58) Field of Search ............................ 310/358, 323.03

(56) References Cited

U.S. PATENT DOCUMENTS 5,702,629 A * 12/1997 Cui et al. .............. 252/62.9 R
5,762,816 A * 6/1998 Kimura et al. ......... 252/62.9 R
6,278,225 B1 * 8/2001 Nagaya et al. .............. 310/358

FOREIGN PATENT DOCUMENTS

| JP | 08325058 A | 12/1996 | ........... C04B/35/49 |
| JP | 11191968 A | 7/1999 | ............. H02N/2/00 |

* cited by examiner

Primary Examiner—Thomas M. Dougherty
(74) Attorney, Agent, or Firm—Nixon & Vanderhye P.C.

(57) ABSTRACT

An ultrasonic motor capable of producing a high output and a method of fabricating the same are disclosed. The ultrasonic motor has a drive source 100 including a piezoelectric device 1 and a transducer 21, in close contact with each other, in which the product of the piezoelectric constant d31, the admittance Ym and the mechanical quality factor Qm measured under the conditions of the drive source 100 is not less than $63 \times 10^{3110}$ m·S/V.

6 Claims, 4 Drawing Sheets

ULTRASONIC MOTOR AND METHOD OF FABRICATING

BACKGROUND OF THE INVENTION

1. Field of the Invention

The present invention relates to an ultrasonic motor capable of producing a high output with a low drive voltage and to a method of fabricating the ultrasonic motor.

2. Description of the Related Art

In recent years, the demand for smaller and lighter parts for automotive vehicles has risen. Especially, demand is high for a quiet motor, for use with automotive vehicles, which is not only capable of producing a high output at a low speed but also has superior response and control characteristics.

Under such a situation, it has been researched to change the motor for automotive vehicles from a DC motor requiring a large, heavy reduction gear to an ultrasonic motor using a piezoelectric device requiring no reduction gear.

The piezoelectric device used in the prior art, however, only has a low output drive (about 1N·m for 150 Vrms) and therefore the conventional ultrasonic motor does not have a high output.

SUMMARY OF THE INVENTION

In view of the problem mentioned above, the object of the present invention is to provide an ultrasonic motor capable of producing a high output and a method of fabricating the ultrasonic motor.

According to one aspect of the invention, there is provided an ultrasonic motor comprising an annular piezoelectric device, a transducer arranged on the piezoelectric device, a rotary member in pressure contact with the transducer, and means for applying two different types of high frequency AC voltages about 90 degrees apart in phase from each other to the piezoelectric device thereby to generate a traveling wave in the transducer and thus to frictionally drive the rotary member, wherein the product of the piezoelectric constant d31 constituting the piezoelectric characteristic obtained by the resonance-antiresonance method for the drive source including the piezoelectric device and the transducer in close contact with each other, the admittance Ym and the mechanical quality factor Qm is $d31 \times Ym \times Qm \geq 63 \times 10^{-10}$ m·S/V.

In the first aspect of the invention, a drive source is employed in which the product of the piezoelectric constant d31 constituting the piezoelectric characteristic obtained by the resonance-antiresonance method of the drive source including the piezoelectric device and the transducer in close contact with each other, the admittance Ym and the mechanical quality factor Qm, i.e. $d31 \times Ym \times Qm \geq 63 \times 10^{-10}$ m·S/V, so that a high-output ultrasonic motor can be provided.

According to a second aspect of the invention, there is provided an ultrasonic motor in which the evaluation of the piezoelectric characteristic according to the resonance-antiresonance method for the drive source with the piezoelectric device and the transducer in close contact with each other is preferably conducted by applying a sine wave of ±1 V within a frequency range containing the resonance-antiresonance frequency of the motor in one of the two phases in which a high-frequency AC voltage is applied for driving the ultrasonic motor.

Under this condition, a drive source is employed in which the product of the piezoelectric constant d31 obtained by measurement, the admittance Ym and the mechanical quality factor Qm, i.e. Qm $d31 \times Ym \times Qm \geq 63 \times 10^{-10}$ m·S/V, thereby making it possible to provide a high-output ultrasonic motor more positively.

According to a third aspect of the invention, there is provided an ultrasonic motor further comprising an adhesive layer 2 to 10 μm thick inserted between the piezoelectric device and the transducer constituting the drive source.

In the case where the thickness of the adhesive layer is smaller than 2 μm, the bonding strength between the piezoelectric device and the transducer is so low that the durability is insufficient.

In the case where the thickness of the adhesive layer is larger than 10 μm, on the other hand, the dielectric constant sharply drops with the piezoelectric constant and the transducer in close contact with each other, and at least a portion of the electrodes formed on the surface of the piezoelectric device is not in contact with the transducer made of a metal part, with the result that the maximum torque of the motor is not sufficiently large.

According to a fourth aspect of the invention, there is provided an ultrasonic motor comprising an annular piezoelectric device, a transducer arranged on the piezoelectric device, a rotary member in pressure contact with the transducer, and means for applying two different types of high frequency AC voltages about 90 degrees apart in phase from each other to the piezoelectric device thereby to generate a traveling wave in the transducer and thus to frictionally drive the rotary member, wherein the composition of the piezoelectric device is given by a general formula

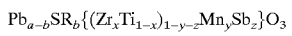

where a=0.90 to 0.97, b=0.03 to 0.07, x=0.48 to 0.53, y=0.005 to 0.02 and z=0.01 to 0.04.

The ultrasonic motor using the piezoelectric device described above can produce a higher output than the conventional ultrasonic motor.

According to a fifth aspect of the invention, there is provided a method of fabricating an ultrasonic motor comprising an annular piezoelectric device, a transducer arranged on the piezoelectric device, a rotary member in pressure contact with the transducer, and means for applying two different types of high frequency AC voltages about 90 degrees apart in phase from each other to the piezoelectric device thereby to generate a traveling wave in the transducer and thus to frictionally drive the rotary member, comprising the steps of measuring the resonance-antiresonance characteristic of the impedance by applying the sine wave of ±1 V to a drive source including the piezoelectric device and the transducer in close contact with each other in the frequency range containing the resonance-antiresonance frequency of the motor in one of the two phases of the applied high-frequency AC voltage, measuring the piezoelectric constant d31, the admittance Ym and the mechanical quality factor Qm obtained from the resonance-antiresonance characteristic, and selecting a drive source in such a manner that the product of the piezoelectric constant d31, the admittance Ym and the mechanical quality factor Qm, i.e. $d31 \times Ym \times Qm \geq 63 \times 10^{-10}$ m·S/V.

By employing this fabrication method, it can be decided what kind of drive source is to be used for obtaining an ultrasonic motor capable of producing a high output, and therefore such a high-output ultrasonic motor can be easily fabricated.

According to a sixth aspect of the invention, there is provided a method of fabricating an ultrasonic motor further comprising an adhesive layer 2 to 10 μm thick interposed between the piezoelectric device and the transducer making up the drive source.

DESCRIPTION OF THE PREFERRED EMBODIMENTS

An ultrasonic motor according to this invention will be explained with reference to FIGS. 1 and 2.

Figure 1:
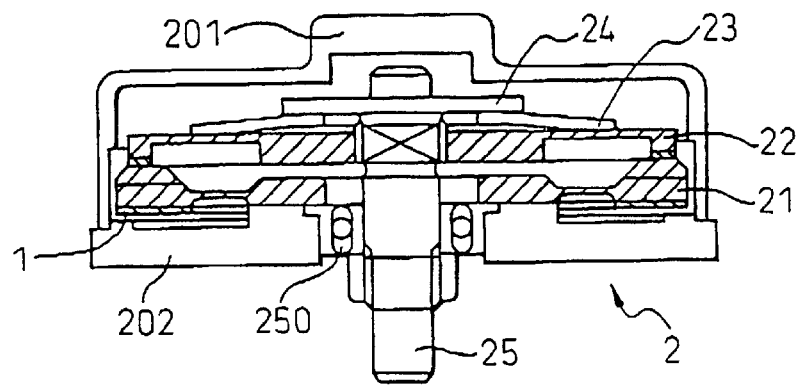
FIG. 1 is a sectional view for an ultrasonic motor according to an embodiment of the invention.
Figure 2:
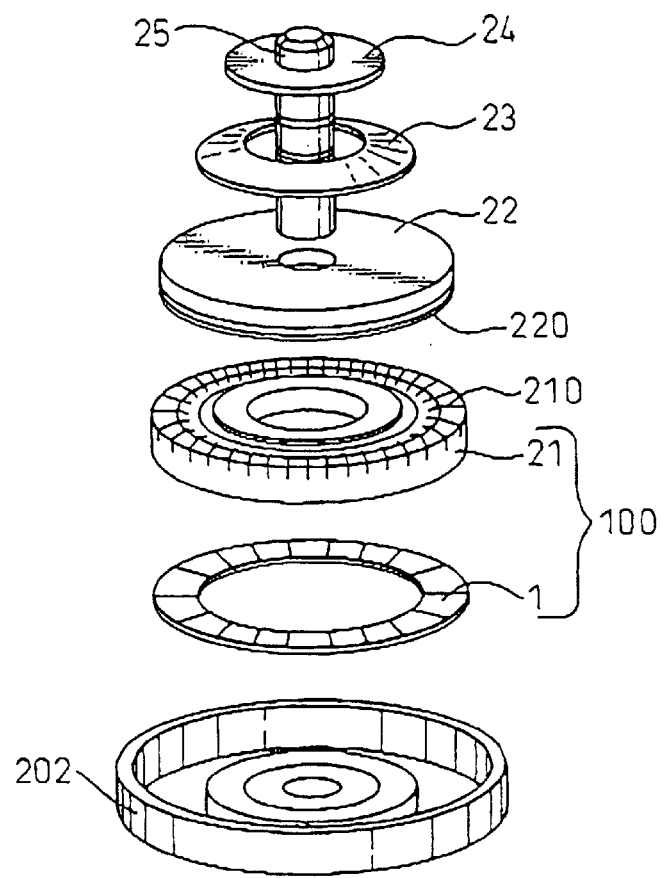
FIG. 2 is a development for explaining an ultrasonic motor according to an embodiment of the invention.

As shown in FIGS. 1 and 2, the surface of a piezoelectric device 1 is bonded to a transducer 21 by an adhesive (one-part epoxy-blended resin) 5 μm thick, for example, thereby to form a drive source 100. The surface of the transducer 21 far from the surface thereof bonded with the piezoelectric device 1 is formed with a multiplicity of toothed protrusions (FIG. 2). A rotary member 22 is formed on the forward ends of the toothed protrusions 210. The side of the rotary member 22 in opposed relation to the transducer 21 is formed with a friction member 220. The rotary member 22 is kept in pressure contact with the transducer 21 by a coned disk spring 23 and a shaft 24.

The coned disk spring 23, the rotary member 22, the transducer 21 and the piezoelectric device 1 are all annular and have the shaft 24 arranged in a central through hole. These members are accommodated in a case composed of an upper housing 201 and a lower housing 202. In FIGS. 1 and 2 reference numeral 250 designates a bearing.

The electrodes formed on the two sides of the piezoelectric device 1 described later have wiring for applying a driving high-frequency (40 KHz) AC voltage (effective voltage value of 210 Vrms) and wiring for producing a detection output (not shown). Also, the ground electrode is introduced from he transducer 21 (not shown). The structure of the piezoelectric device 1 according to this embodiment will be explained.

Figure 3:
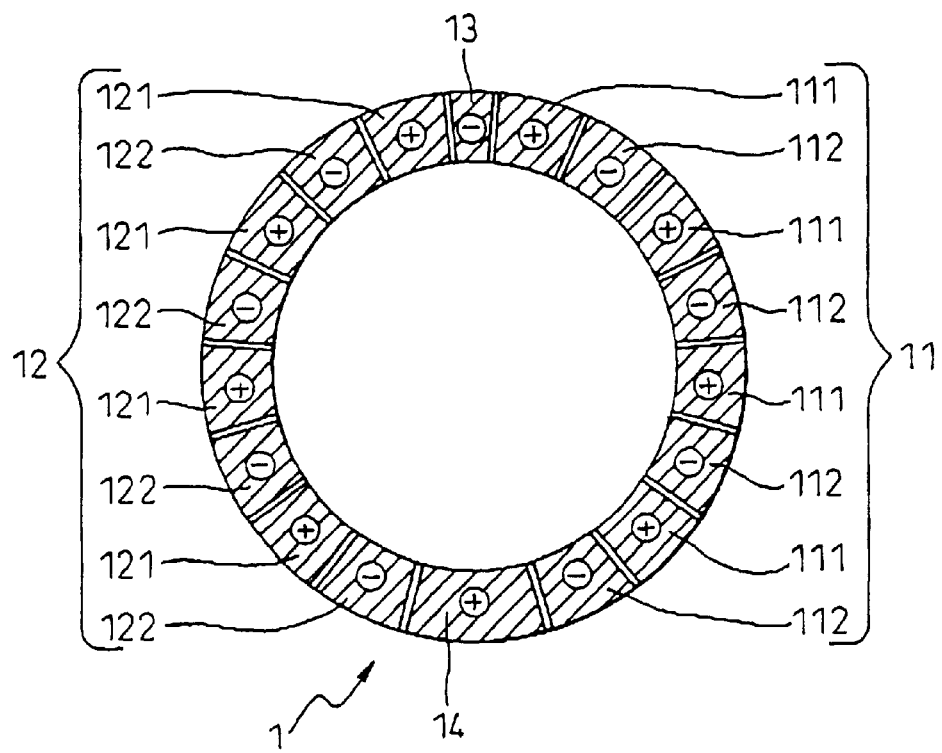
FIG. 3 is a plan view showing the surface of a piezoelectric device according to an embodiment.
Figure 4:
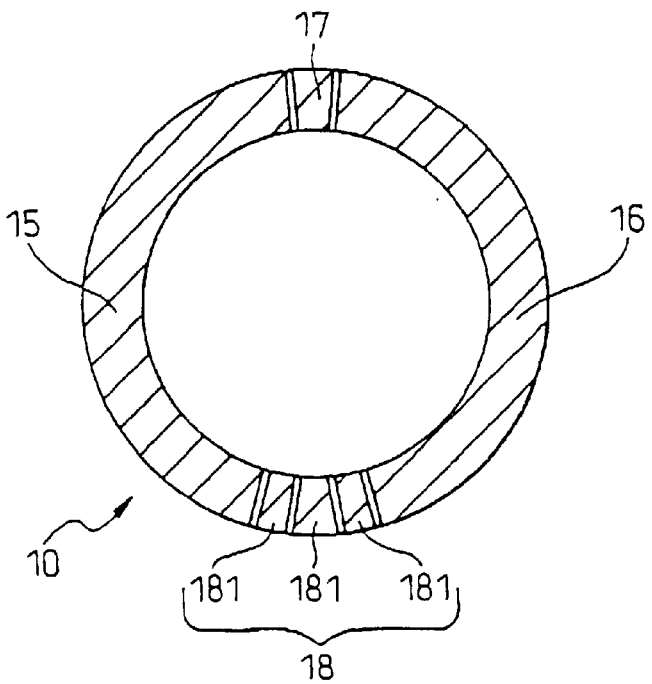
FIG. 4 is a plan view showing the reverse surface of a piezoelectric device according to an embodiment.

The surface of the piezoelectric device 1 according to the embodiment is shown in FIG. 3, and the reverse surface thereof in FIG. 4.

The front surface of the piezoelectric device 1 is formed with a first detection electrode 13 and a second detection electrode 14 arranged 180 degrees apart from each other along the circumference of the piezoelectric device 1. Further, the two areas between the first and second detection electrodes 13, 14 are formed with first and second driving electrode groups 11, 12 including a plurality of driving electrodes 111, 112, 121, 122 having a circumferential length of λ/2 where λ is defined as 2a+2b assuming that a is the circumferential length of the driving electrode 111 or 112 and b is the size of the gap between each two adjacent driving electrodes 111 and 112. The adjacent ones of the first and second detection electrodes 13, 14 and the driving electrodes 111, 112, 121, 122 formed on the surface of the piezoelectric device are polarized in opposite directions.

As shown in FIG. 4, the reverse surface of the piezoelectric device 1 is formed with a first reverse surface detection electrode 17 and first and second reverse surface driving electrodes 15, 16 corresponding to the first detection electrode 13 and the first and second driving electrodes 11, 12, respectively.

Further, the reverse surface of the piezoelectric device 1 is formed with a second reverse surface detection electrode group 18 in pairs with the second detection electrodes 14 paired with the second detection electrode 14 at a position corresponding to the circumferential length of 3λ/4. The second reverse surface detection electrode group 18 includes three second reverse surface detection electrodes 181 having a circumferential length of λ/4.

Now, a method of fabricating the piezoelectric device according to this embodiment will be explained.

The piezoelectric device according to this invention is mainly composed of Pb zirconate titanate (PZT), which contains, for example, 95% of Pb and 5% of Sr {(52% of ZrO and 48% of Ti)×96% and (one third of Mn and two thirds of Sb)×4%}$O_3$. This piezoelectric device is annular in shape and has an outer diameter of φ60 mm, an inner diameter of φ45 mm and a thickness of 0.5 mm. The two surfaces of this annular piezoelectric device are formed by screen printing with Ag as a main component (grain size of 2 to 3 μm, powder of 60 wt %, frit of 4 wt %, resin of 8 wt % and solvent of 28 wt %). This screen printing forms the first driving electrode group 11 the second driving electrode group 12, the first detection electrode 13 and the second detection electrode 14 on the front surface as shown in FIG. 3. After that, the assembly is left to stand for ten minutes at room temperature and then dried for 15 minutes at 100° C. Then, the reverse surface is formed with the first reverse surface driving electrode 15, the second reverse surface driving electrode 16, the first reverse surface detection electrode 17 and the second reverse surface detection electrode group 18 as shown in FIG. 4. After that, the assembly is left to stand for ten minutes at room temperature, dried for 15 minutes at 100° C. and fired at 550° C., thereby securely fixing the electrodes on the annular piezoelectric device. In this way, a piezoelectric device 1 having the electrodes on the two surfaces thereof is obtained as shown in FIGS. 3 and 4.

After that, the piezoelectric device is impressed with a voltage of 2 KV/mm for 20 minutes in an insulating solution of 100° C. so that the adjacent ones of the electrodes formed on the front surface are polarized in opposite directions (i.e. front to reverse surfaces and reverse to front surfaces).

Thus, the piezoelectric device 1 according to this embodiment is produced.

The operation of the ultrasonic motor according to this embodiment fabricated in the way described above will be explained.

In starting the ultrasonic motor, high-frequency (40 KHz) AC currents (effective voltage value of 210 Vrms) about 90 degrees apart from each other in electrical phase are applied between the first and second reverse surface driving electrodes 15, 16 and the transducer 21 of the piezoelectric device 1. As a result, two standing waves are generated and combined into a traveling wave.

Consequently, an oscillation is generated plotting an elliptical trace at the forward end of the toothed protrusions 210 of the transducer 21 bonded to the piezoelectric device 1.

The toothed protrusions 210 are in contact with the rotary member 22 through the friction member 220, with which the rotary member 22 is kept in pressure contact by a coned disk spring 23. Thus, the rotary member 22 is rotated by the friction force.

The ultrasonic motor according to this embodiment exhibits its function as the result of this operation.

The piezoelectric device 1 constituting the feature of this invention will be described in detail below.

The kind of piezoelectric device most suitable for producing a high-output ultrasonic motor was studied in depth according to this embodiment.

For this purpose, annular piezoelectric devices were fabricated of PZT materials of a different composition, and the electrode patterns shown in FIGS. 3 and 4 were formed on the two surfaces of each annular piezoelectric device.

Figure 5:
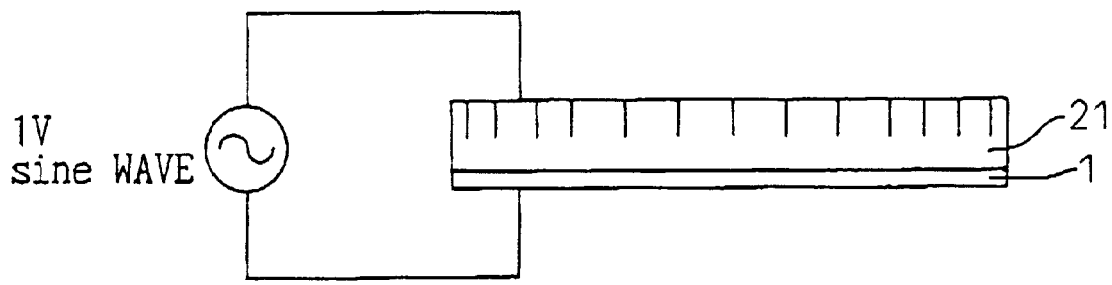
FIG. 5 is a diagram for explaining the measurement of the transducer subassembly characteristic.

The characteristics of the drive source 100 of this piezoelectric device were evaluated as shown in FIG. 5.

The piezoelectric constant d31, the mechanical quality factor Qm and the admittance Ym were measured in the following way.

Specifically, a device having an ordinary shape for an ultrasonic motor of traveling wave type (outer diameter of φ60 mm, inner diameter of φ45 mm and thickness of 0.5 mm with two-phase sine waves) as described in "Ultrasonic Waves and How to Use Them" p. 58, published by Nikkan Kogyo Shimbun, was employed as the piezoelectric device 1.

On the other hand, the transducer 21 of a metal (material SPCC) was employed.

The piezoelectric device 1 and the transducer 21 were bonded to each other through an adhesive layer 5 $\mu$m thick (one-part epoxy-blended resin) on the surface of the piezoelectric device thereby to form a drive source 100.

A sine wave of ±1 V in the frequency range containing the resonance-antiresonance frequency of the motor was impressed between one of the reverse surface driving electrodes of the piezoelectric device 1 making up the drive source 100 and the transducer 21. Under this condition, the piezoelectric constant d31 constituting a piezoelectric characteristic, the admittance Ym and the mechanical quality factor Qm were measured.

The maximum torque making up a characteristic of the drive source 100 is associated with a rotational speed of substantially zero of the ultrasonic motor driven.

Figure 6:
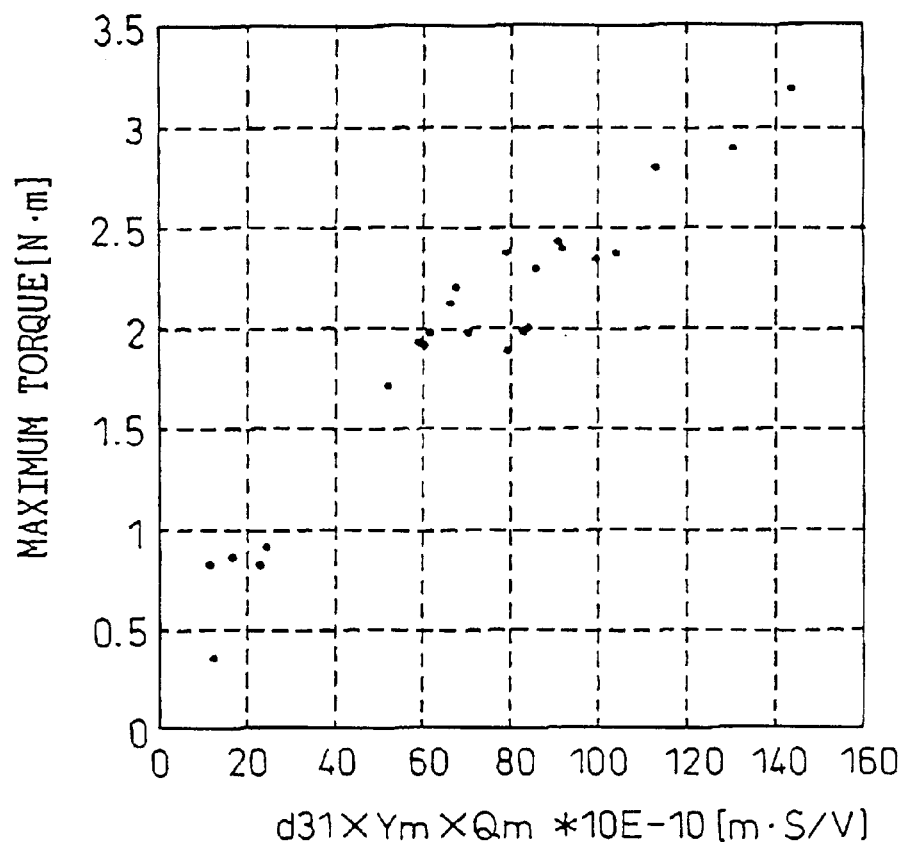
FIG. 6 is a characteristic diagram showing the relation between the maximum torque and the product of the piezoelectric constant d31, the admittance Ym and the mechanical quality factor Qm of the transducer subassembly.
Figure 7:
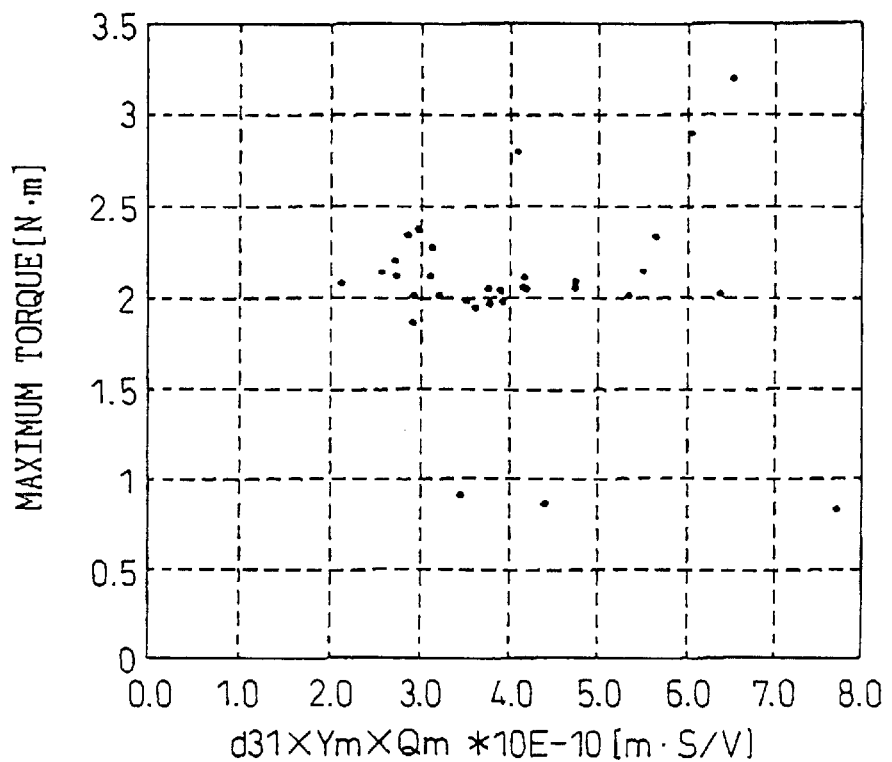
FIG. 7 is a characteristic diagram showing the relation between the maximum torque and the product of the piezoelectric constant d31, the admittance Ym and the mechanical quality factor Qm of the device proper.

FIG. 6 shows the relation between the product of the piezoelectric constant d31, the admittance Ym and the mechanical quality factor Qm associated with the drive source 100 plotted on the abscissa and the maximum torque plotted on the ordinate. FIG. 7 shows the relation between the product of the piezoelectric constant d31, the admittance Ym and the mechanical quality efficient Qm associated with the piezoelectric device 1 proper plotted on the abscissa and the maximum torque plotted on the ordinate. As a result, it was discovered for the first time that there is a correlation between the product of the piezoelectric constant d31, the admittance Ym and the mechanical quality efficient Qm of the drive source 100 and the maximum torque as shown in FIG. 6.

Specifically, the maximum torque increases with the product of the piezoelectric constant d31, the admittance Ym and the mechanical quality factor Qm of the drive source 100. Especially it was found that an ultrasonic motor of the desired high output can be obtained in the case where the product of the piezoelectric constant d31, the admittance Ym and the mechanical quality factor Qm is not less than $63 \times 10^{-10}$ m·S/V.

The inventors decided that the reason why the maximum torque increases with the product of the piezoelectric constant d31, the admittance Ym and the mechanical quality factor Qm is that the piezoelectric constant d31 is an amplitude and the mechanical alacrity factor Qm is an amplification factor at the time of resonance, so that the input energy in terms of the amplitude of the device increases under the driving conditions (constant voltage) of the drive source 100 and so does the admittance Ym under the same voltage.

The thickness of the adhesive layer used for the drive source 100 will be described in detail below.

Figure 8:
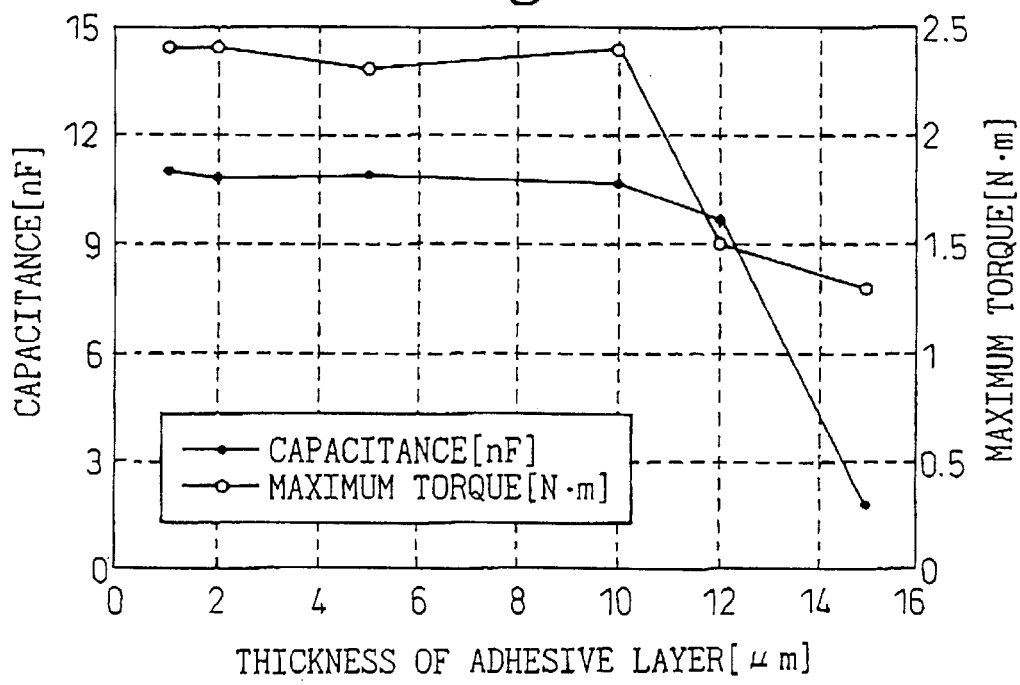
FIG. 8 is a characteristic diagram showing the relation between the maximum torque and the electrostatic capacitance against the thickness of the adhesive layer.

FIG. 8 shows the change of the maximum torque and the electrostatic capacitance against the thickness of the adhesive layer for boding the piezoelectric device 1 and the transducer 21 to each other.

It can be seen from FIG. 8 that in the case where the thickness of the adhesive layer used for arranging the transducer 21 on the piezoelectric device 1 is not less than 10 $\mu$m, the electrostatic capacitance considerably decreases with the piezoelectric device 1 and the transducer 21 in close contact with each other, and therefore at least one portion of the electrodes formed on the surface of the piezoelectric device 1 is out of contact with the transducer 21 which is a metal part. As a result, even in the case where the driving voltage of 210 Vrms is applied to the ultrasonic motor, a voltage loss that occurs in the adhesive layer makes it impossible to apply an input voltage effectively to the piezoelectric device 1 resulting in a considerable decrease in the maximum torque of the motor.

Table 1 shows various thicknesses of the adhesive layer and corresponding numbers of operations possible.

The number of operations is that of the on-off operations performed at time intervals of several seconds, and is the product of the on time and the driving frequency.

TABLE 1

| THICKNESS OF ADHESIVE LAYER ($\mu$M) | NUMBER OF OPERATIONS (TIMES) |
| --- | --- |
| 1 | $3 \times 10^9$ |
| 2 | $4.3 \times 10^{10}$ |
| 5 | $2.8 \times 10^{10}$ |
| 10 | $3.7 \times 10^{10}$ |
| 12 | $5.7 \times 10^{10}$ |
| 15 | $4.5 \times 10^{10}$ |

As clear from Table 1 the number of operations possible is reduced and the durability is insufficient in the case where the adhesive layer is thinner than 2 $\mu$m.

The material of the piezoelectric device which can produce the relation that the product of the piezoelectric constant d31, the admittance Ym and the mechanical quality factor Qm constituting the piezoelectric characteristics of the drive source 100, i.e. $d31 \times Ym \times Qm \geq 63 \times 10^{-10}$ m·S/V, will be described.

According to this embodiment, PbO, $SrCo_3$, $ZrO_2$, $TiO_2$, $Sb_2O_3$ and $MnCO_3$ were weighted to a predetermined composition and mixed in a ball mill. The mixture powder was placed in an alumina bowl, calcinated at 850° C. and crushed in ball mill. Polyvinyl alcohol (PVA) was added to the crushed powder, which was then granulated by spraying. The resulting granulated powder was molded at 100 MPa and baked at 1200 to 1300° C. The sintered material thus obtained was processed into an annular member having diameters of φ60 and φ45 with a thickness of 0.5 and a silver electrode was formed on the two surfaces. After that, the sample was polarized at 2 KV/mm, in silicon oil at 100° C., into a piezoelectric device. This piezoelectric device 1 was bonded with the transducer 21, and with the drive source 100 thus formed, the piezoelectric characteristic was evaluated by the resonance-antiresonance method. Then, an ultrasonic motor was assembled and the maximum torque evaluated. The result is shown in Table 2 below.

TABLE 2

| SAMPLE | MAIN COMPONENTS [mol] | | MINOR COMPONENTS [mol] | | | PERFORMANCE | |
|---|---|---|---|---|---|---|---|
| | a | b | x | y | z | dQYm | TORQUE [Nm] |
| 1 | 0.97 | 0.03 | 0.4925 | 0.005 | 0.01 | 85.2 | 2.29 |
| 1 | 0.97 | 0.05 | 0.4841 | 0.02 | 0.04 | 79.0 | 2.99 |
| 1 | 0.97 | 0.07 | 0.5141 | 0.01 | 0.02 | 82.5 | 1.98 |
| 2 | 0.95 | 0.03 | 0.486 | 0.01 | 0.02 | 91.2 | 2.39 |
| 2 | 0.95 | 0.05 | 0.4982 | 0.02 | 0.04 | 103.6 | 2.37 |
| 2 | 0.95 | 0.07 | 0.49955 | 0.01 | 0.02 | 90.2 | 2.42 |
| 3 | 0.93 | 0.05 | 0.4982 | 0.02 | 0.04 | 99.1 | 2.34 |
| 4 | 0.92 | 0.09 | 0.485 | 0.01 | 0.02 | 70.1 | 1.98 |
| 5 | 0.97 | 0.07 | 0.4841 | 0.02 | 0.04 | 66.1 | 2.12 |
| 6 | 0.95 | 0.05 | 0.4925 | 0.005 | 0.01 | 78.7 | 2.37 |
| 7 | 0.93 | 0.05 | 0.4841 | 0.02 | 0.04 | 143.3 | 2.47 |
| 8 | 0.92 | 0.05 | 0.5141 | 0.01 | 0.02 | 112.6 | 2.4 |
| 9 | 0.9 | 0.07 | 0.4841 | 0.02 | 0.04 | 67.4 | 2.2 |
| 10 | 0.92 | 0.07 | 0.52205 | 0.005 | 0.01 | 114.5 | 2.25 |
| 11 | 0.92 | 0.05 | 0.4925 | 0.005 | 0.01 | 53.6 | 2 |
| 12 | 0.92 | 0.03 | 0.49955 | 0.01 | 0.02 | 130.1 | 2.43 |
| 13 | 0.99 | 0.03 | 0.50985 | 0 | 0.01 | 23.0 | 0.83 |
| 13 | 0.93 | 0.07 | 0.5047 | 0 | 0.02 | 24.5 | 0.91 |
| 13 | 0.95 | 0.05 | 0.49955 | 0 | 0.03 | 16.8 | 0.86 |
| 14 | 0.89 | 0.07 | 0.512425 | 0.005 | 0 | 12.6 | 0.36 |
| 14 | 0.93 | 0.05 | 0.50985 | 0.01 | 0 | 11.7 | 0.83 |
| 16 | 0.92 | 0.07 | 0.5047 | 0.02 | 0 | 52.1 | 1.71 |
| 17 | 1 | 0.03 | 0.476376 | 0.025 | 0.05 | 60.0 | 1.91 |
| 17 | 0.94 | 0.05 | 0.46865 | 0.03 | 0.06 | 59.1 | 1.93 |
| 17 | 0.99 | 0.03 | 0.49955 | 0.01 | 0.02 | 61.5 | 1.98 |

As apparent from Table 2 the product d31×Ym×Qm of the piezoelectric characteristic is small and so is the maximum torque of the motor in the range out of the general formula $Pb_{a-b}Sr_b\{(Zr_xTi_{1-x})Mn_ySb_z\}O_3$ defined by a of 0.9 to 0.97, b of 0.03 to 0.07, x of 0.48 to 0.53, y of 0.005 to 0.02 and z of 0.01×0.04 (see FIG. 6 for the relation between the product d31×Ym×Qm of the piezoelectric characteristic and the maximum torque of the motor).

It will thus be understood from the foregoing description that, according to this invention, a stable, high-output ultrasonic motor can be obtained by assuring that the product of the piezoelectric constant d31, the admittance Ym and the mechanical quality factor Qm is not less than $63 \times 10^{-10}$ m·S/V with the sine wave of ±1 V applied in the frequency range containing the resonance-antiresonance frequency of the motor in one of the two phases in which a high-frequency AC voltage is applied to the drive source 100 including a piezoelectric device and a transducer in close contact with each other.

The invention was described above with reference to a piezoelectric device for producing a high-output ultrasonic motor. In view of the fact that the object of the invention is to provide a piezoelectric device capable of producing a higher output than in the prior art for the same size, however, the invention is of course applicable with equal effect to an ultrasonic motor intended to be reduced in size with the same output as in the prior art.

What is claimed is:

1. An ultrasonic motor comprising an annular piezoelectric device, a transducer arranged on the piezoelectric device, a rotary member in pressure contact with the transducer, and means for applying two different types of high frequency AC voltages about 90 degrees apart in phase from each other to the piezoelectric device thereby to generate a traveling wave in the transducer and thus to frictionally drive the rotary member, wherein the product of the piezoelectric constant d31 constituting the piezoelectric characteristic obtained by the resonance-antiresonance method for a drive source including the piezoelectric device and the transducer in close contact with each other, the admittance Ym and the mechanical quality factor Qm, i.e. d31×Ym× Qm≧$63 \times 10^{-10}$ m·S/V.

2. An ultrasonic motor according to claim 1, wherein the evaluation of the piezoelectric characteristic according to the resonance-antiresonance method for the drive source with the piezoelectric device and the transducer in close contact with each other is preferably conducted by applying a sine wave of ±1 V within a frequency range containing the resonance-antiresonance frequency of the motor in one of the two phases in which a high-frequency AC voltage is applied for driving the ultrasonic motor.

3. An ultrasonic motor according to claim 1, further comprising an adhesive layer 2 to 10 μm thick inserted between the piezoelectric device and the transducer constituting the drive source.

4. An ultrasonic motor comprising an annular piezoelectric device, a transducer arranged on the piezoelectric device, a rotary member in pressure contact with the transducer, and means for applying two types of high frequency AC voltages about 90 degrees apart in phase from each other to the piezoelectric device thereby to generate a traveling wave in the transducer and thus to frictionally drive the rotary member, wherein the composition of the piezoelectric device is given by a general formula

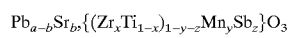

$$Pb_{a-b}Sr_b\{(Zr_xTi_{1-x})_{1-y-z}Mn_ySb_z\}O_3$$

where a=0.90 to 0.97, b=0.03 to 0.07, x=0.48 to 0.53, y=0.005 to 0.02 and z=0.01 to 0.04.

5. A method of fabricating an ultrasonic motor comprising an annular piezoelectric device, a transducer arranged on the piezoelectric device, a rotary member in pressure contact with the transducer, and means for applying two types of high frequency AC voltages about 90 degrees apart in phase from each other to the piezoelectric device thereby to generate a traveling wave in the transducer and thus to frictionally drive the rotary member, comprising the steps of:

measuring the resonance-antiresonance characteristic of the impedance by applying the sine wave of ±1 V to a drive source including the piezoelectric device and the transducer in close contact with each other in the frequency range containing the resonance-antiresonance frequency of the motor in one of the two phases of the applied high-frequency AC voltage, measuring the piezoelectric constant d31, the admittance Ym and the mechanical quality factor Qm obtained from he resonance-antiresonance characteristic, and selecting the drive source in such a manner that the product of the piezoelectric constant d31, the admittance Ym and the mechanical quality factor Qm is given as d31×Ym×Qm≧$63 \times 10^{-10}$ m·S/V.

6. A method of fabricating an ultrasonic motor according to claim 5, further comprising an adhesive layer 2 to 10 μm thick interposed between the piezoelectric device and the transducer making up the drive source.

* * * * *